UNITED STATES PATENT OFFICE 2,307,361

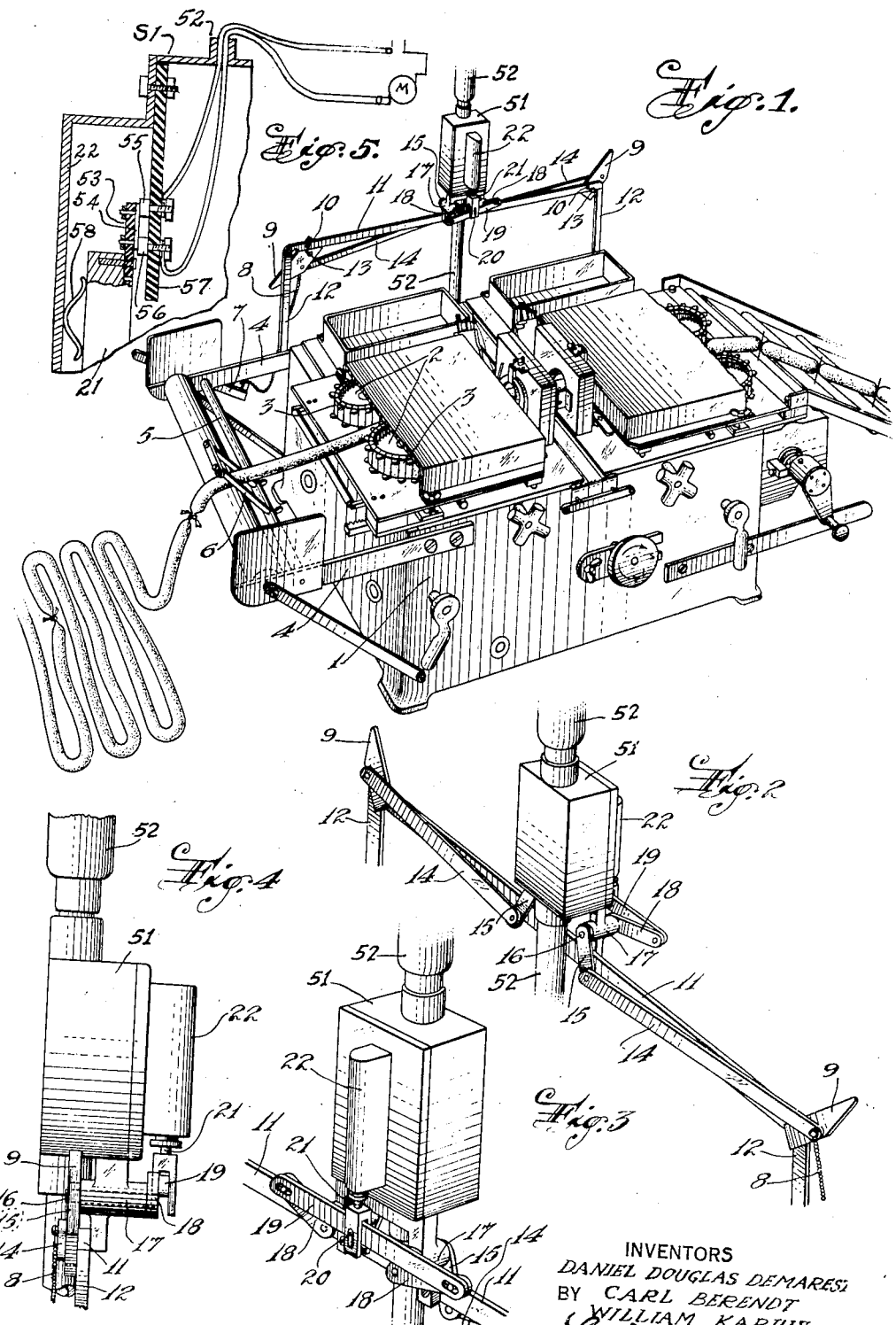

SWITCH CONTROL DEVICE

Daniel Douglas Demarest, New York, N. Y., Carl Berendt, East Orange, and William Karius, Irvington, N. J., assignors to Automatic Linker, Inc., Newark, N. J., a corporation of New York Application August 1, 1940, Serial No. 349,210

7 Claims. (Cl. 17—34)

This invention relates to switch control devices, and more particularly to the provision on a sausage linking machine of a control device for automatically opening a switch when sausage casing entering machine begins to bunch.

In sausage linking machines thus far no means have been found to prevent occasional "bunching" or the passage of irregularly stuffed sausage casings as they enter the machine. Should the machine continue in operation when the sausage casings bunch, considerable time is consumed in removing the damaged sausage casings and conditioning the machine for proper operation.

It is, therefore, an object of this invention to provide a device to automatically open a control switch of a sausage linking machine at the instant the sausage casings begin to "bunch."

A further object is the provision of a device for controlling the operation of a switch for a sausage linking machine, so that the switch cannot be closed until certain precautions have been taken, thus preventing accidents and injuries.

These and other advantageous objects, which will later appear, are accomplished by the simple and practical construction and arrangement of parts hereinafter described and exhibited in the accompanying drawing, forming part hereof, and in which:

Fig. 1 is a perspective view of a sausage linking machine embodying the invention, Fig. 2 is a perspective view of the switch control device, Fig. 3 is a perspective view showing details of the device, Fig. 4 is a side view of a portion of the device, and Fig. 5 is a sectional view showing details of a switch used in the device.

Referring to the drawing, in Fig. 1 is shown a sausage linking machine of the type disclosed in copending application Serial Number 263,364, filed March 22, 1939, which is now Patent Number 2,228,075, dated January 7, 1941. This machine has a main supporting casing 1. Rotatably mounted on the upper surface of the casing 1 are gear feed wheels 2 over which pass rubber feed belts 3 between which the sausage is passed.

Attached to the supporting casing 1 are a pair of outwardly extending bars 4 which rotatably support a shaft 5. Fixed to the shaft 5 and extending upwardly therefrom is a U-shaped feed trip 6 through which passes the sausage.

Fixed to one end of the shaft 5 is an arm 7 which has attached thereto a chain 8, the other end of which is attached to an arm 9 pivoted at 10 to a bar 11 which is supported by uprights 12 attached to the casing 1. A pin 13 projecting from the arm 9 is adapted to engage the bar 11 and limit the upward movement of arm 9. Pivotally attached to arm 9 beyond the pin 13 is a link 14 which has the other end thereof pivotally attached to one end of an arm 15 fixed to a short shaft 16 supported by a bearing 17. Also fixed to shaft 16 is an arm 18, which is pivotally connected to the arm 19 of a lever centrally pivoted at 20 to the lower end of a plunger 21 which controls a switch in a switch box 51 connected to wires in electric conduits 52, the box 51 having mounted thereon the casing 22, the switch controlling the operation of the machine. When the plunger 21 moves upwardly the switch will be closed and when it moves downwardly the switch will be opened.

It is obvious that numerous types of switches can be used without departing from the spirit of the invention. For example, in Fig. 5, is shown a simple switch arrangement in which the plunger 21 has fixed thereto a strip 53 of insulating material having attached thereto a metal contact bar 54, which engages spaced contacts 55, 56, mounted on a plate 57 of insulating material, which is supported by the casing 51. The plunger 21 is shown in a raised position, and the switch is closed. When the plunger is moved downwardly the bar 54 will break contact with contact 55 and open the electric circuit, which includes a motor M for operating the sausage linking machine. A bowed spring 58 provides firm contact between bar 54 and contacts 55, 56.

The structure described pertains to a switch controlled device on the machine as shown in Fig. 1. The structure on the right hand side of the machine is identically the same insofar as the arms 9, links 14, etc., are concerned.

From an inspection of the drawing it will be seen that the switch cannot be closed until both of the arms 9 are in a raised position as shown on the right-hand side of the machine in Fig. 1. When the arm 9 is in the lowered position as shown on the left hand side of the machine, in Fig. 1, the switch will be opened.

In operation, to place the machine in condition to operate, both of the arms 9 are moved to the raised position (see Fig. 2). This will cause a tightening of the chain 8, and if in any event the sausage should bunch at the feed trip 6, the latter will be moved in a clock-wise direction (see Fig. 1) by the pressure due to the bunching of the sausage casing, which will rotate the shaft 5 and move arm 7 in a clockwise direction to exert a pull on the chain 8 and move the arm 9 to the lowered position as shown on the left-hand side of the machine in Fig. 1, which opens the switch in switch box 51 and discontinues the operation of the machine, thus preventing any damage which might result from the bunched sausage casings becoming entangled in the feeding mechanism.

From time to time it may be necessary to make adjustments of the machine. As is seen in the drawing, on the left hand side of the machine are shown the entering feed rolls and on the right hand side are the exit feed rolls. Should an adjustment be necessary to be made to the entering feed rolls, the arm 9 on the left hand side of the machine will be moved to the lowered position to open the switch. The machine cannot now be started until the arm 9 is moved to the raised position. Should a person be adjusting the parts on the right hand side of the machine, the arm 9 on the right hand side of the machine will be moved to the lower position which would prevent operation of the machine. With such an arrangement, should a person working on the left hand side of the machine inadvertently raise the arm 9 on the left hand side, the machine would not start until the person on the right hand side of the machine has also raised the arm 9 on that side of the machine.

From the above description it will be seen that there has been provided a simple device for automatically stopping a sausage linking machine instantly upon the bunching of sausage casings passing through the machine; and also means to prevent operation of the machine during repair or adjustment thereof and thus prevent accidents to persons who may be working upon the machine.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described the invention, what is claimed as new and desired to be secured by Letters Patent, is:

1. A switch control device for a sausage linking machine, comprising a switch having a slidable plunger for opening or closing the electric circuit of the motor of the machine, a two-armed lever pivoted to the lower end of said plunger, a pair of bell cranks, means for rotatably supporting said bell cranks adjacent said lever, said bell cranks having arms connected to the ends of the lever, a pair of opposite directed links pivoted to arms of said bell cranks, each of said links having arms pivotally connected thereto, a supporting bar to which said last mentioned arms are pivoted, pins projecting from said last mentioned arms adapted to engage said supporting bar to limit the movement of said last mentioned arms, a pair of uprights attached to said supporting bar, said uprights being attached to the main body of a sausage linking machine, a chain attached to the end of one of said last mentioned arms, the other end of said chain being attached to a third arm, a shaft fixed to said third arm, a pair of bars rotatably supporting said shaft, and a U-shaped feed trip projecting upwardly from said shaft.

2. In a sausage linking machine having a main supporting casing, a pair of bars projecting outwardly from one end of said casing, a shaft rotatably supported by said bars, a U-shaped feed trip projecting upwardly from said shaft and fixed thereto, an arm fixed to one end of said shaft, a chain attached to said arm, a second arm having the chain attached thereto, a bar to which said second arm is pivoted, a pair of uprights attached to said casing and extending upwardly to support said bar, a pin projecting from said second arm to limit upward movement thereof, a link having one end pivoted to said second arm, a bell crank having an arm pivotally connected to said link, a plunger pivotally connected to the other arm of the bell crank, and a switch for the electric motor of the machine controlled by the position of said plunger.

3. In a sausage linking machine, a main supporting casing, a pair of bars extending from said casing, a shaft rotatably supported by said bars, a feed trip extending upwardly and fixed to said shaft, an arm attached to one end of the shaft, a switch for controlling the operation of the machine, a plunger for opening or closing said switch, and means connected to said arm and plunger to open said switch when pressure is exerted on said feed trip to rotate the shaft in a predetermined direction.

4. In a sausage linking machine driven by an electric motor, a main supporting casing having a pair of uprights attached to one end thereof, a bar supported by said uprights, a pair of arms each pivoted at an end of said bar, a switch for said motor having a slidable plunger for opening or closing the switch, a two-armed lever pivoted to the lower end of said plunger, bell cranks pivotally connected to the ends of said two-armed lever, and links pivoted to arms of said bell cranks, said links being pivotally connected to said first mentioned arms.

5. In a sausage linking machine driven by an electric motor, a main supporting casing having a pair of uprights attached to one end thereof, a bar supported by said uprights, a pair of arms each pivoted at an end of said bar, a switch for said motor having a slidable plunger for opening or closing the switch, a two-armed lever pivoted to the lower end of said plunger, bell cranks pivotally connected to the ends of said two-armed lever, and links pivoted to arms of said bell cranks, said links being pivotally connected to said first mentioned arms, said arms having pins projecting laterally therefrom to engage said bar to limit the upward movement of said first mentioned arms.

6. In a sausage linking machine driven by an electric motor, a main supporting casing having a pair of uprights attached to one end thereof, a bar supported by said uprights, a pair of arms pivoted to the ends of said bar, a switch for said motor having a slidable plunger for opening or closing the switch, a two-armed lever pivoted to the lower end of said plunger, bell cranks pivotally mounted to the ends of said two-armed lever, links pivoted to arms of said bell cranks, said links being pivotally connected to said first mentioned arms, a shaft rotatably supported by said casing, a feed trip attached to said shaft, and means connected to one of said first mentioned arms and said shaft to move said first mentioned arms to a position to open the switch when pressure is exerted upon the feed trip to rotate the shaft in a predetermined direction.

7. In a sausage linking machine driven by an electric motor, a main supporting casing having a pair of uprights attached to one end thereof, a bar supported by said uprights, a pair of arms pivoted to the ends of said bar, a switch for said motor having a slidable plunger for opening or closing the switch, a two-armed lever pivoted to the lower end of said plunger, bell cranks pivotally connected to the ends of said two-armed lever, links pivoted to arms of said bell cranks, said links being pivotally connected to said first mentioned arms, a guide device for sausage casings passing through the machine, and means associated with said feed trip to move one of said first mentioned arms to a switch opening position when pressure is exerted upon the feed trip due to bunching of sausage casings.

DANIEL DOUGLAS DEMAREST.
CARL BERENDT.
WILLIAM KARIUS.